United States Patent [19]
Bryson

[11] Patent Number: 5,864,225
[45] Date of Patent: Jan. 26, 1999

[54] DUAL ADJUSTABLE VOLTAGE REGULATORS

[75] Inventor: Stephen W. Bryson, Cupertino, Calif.

[73] Assignee: Fairchild Semiconductor Corporation, Portland, Me.

[21] Appl. No.: 868,662

[22] Filed: Jun. 4, 1997

[51] Int. Cl.$^6$ ................................. G05F 1/40; H02J 1/10
[52] U.S. Cl. ............................... 323/268; 307/18; 307/24; 307/52
[58] Field of Search ................................. 307/18, 24, 25, 307/27, 28, 52, 75; 323/268

[56] References Cited

U.S. PATENT DOCUMENTS

| | | | |
|---|---|---|---|
| 4,350,891 | 9/1982 | Wuerflein | 378/110 |
| 5,412,308 | 5/1995 | Brown | 307/18 |
| 5,550,729 | 8/1996 | Wissell | 307/75 |
| 5,691,630 | 11/1997 | Chosa | 323/267 |

FOREIGN PATENT DOCUMENTS 0 190 110   1/1986   European Pat. Off. ................ 86/32

OTHER PUBLICATIONS

Maxim Dual–Output Power–Supply Controller for Notebook Computers, Rev. 1, May 1994.
Linear Technology Synchronous Regulator Controller for N–or–P Channel Mosfets, Initial Release, Feb. 1995.

*Primary Examiner*—Peter S. Wong
*Assistant Examiner*—Bao Q. Vu
*Attorney, Agent, or Firm*—Townsend and Townsend and Crew LLP

[57] ABSTRACT

A dual adjustable voltage regulator combining a DC—DC switching regulator with a linear regulator implemented on a single chip is disclosed. The invention provides switching circuitry that can select between a fixed output voltage level and a user-adjustable output voltage. The circuit further provides means to automatically detect and generate power supply voltage levels as required by the system.

11 Claims, 2 Drawing Sheets

DUAL ADJUSTABLE VOLTAGE REGULATORS

This application is related to U.S. patent application No. 08/622,098, entitled "Constant On-Time Architecture for Switching Regulators," filed Mar. 26, 1996, which is hereby incorporated by reference in its entirety for all purposes.

BACKGROUND OF THE INVENTION

The present invention relates in general to integrated circuits, and in particular to a circuit that provides two adjustable voltage regulators for systems having dual supply voltages.

The semiconductor industry continues to downsize device geometries with every new generation of devices. The smaller and higher density integrated circuit devices help reduce the cost of end products and facilitate manufacture of ever shrinking portable computing systems. A related and in some applications equally important performance consideration, is the power demands of a given device. Process and circuit designers continue to focus their efforts on developing circuits that take less silicon area and consume less power.

In the case of microprocessors, for example, previous generations were designed to operate with a single 5 volt power supply. For battery-operated portable applications where power consumption is more critical, microprocessors have been designed with core circuitry running at lower voltages of, for example, 3.3 volts while the interface circuitry runs at 5 volts. This power saving technique has been widely adopted in not only other (e.g., desktop) processor designs, but also in many other types of integrated circuits including memories and programmable logic. Accordingly, current generations of microprocessors are being designed with two power supplies, a first one at for example 3.3 volts, that powers the interface, and a second lower voltage at for example 2.8 volts that powers the core circuitry.

The requirement for two power supplies, however, poses a problem for the board designer. The silver box that supplies power to a processor mother-board typically provides only 5 and 12 volt power supply voltages. The output of the 5 volt power source must therefore be switched to generate two different voltages on the mother-board. This requires using voltage down converters that can generate lower voltages of for example 3.3 and 2.8 volts from the 5 volt source. This is further complicated by the fact that different microprocessors are designed to operate with different supply voltage levels. For example, the Intel P54 processor requires a 3.5 volt supply voltage, while the Intel P55C processor uses a dual supply arrangement with a 3.3 volt power supply for the interface and a 2.8 volt power supply for the core circuitry.

Furthermore, the electrical current requirements for two different supply voltages may differ substantially. The 3.3 volt supply, for example, provides power to the interface circuitry (I/Os) that typically runs at a lower frequency of, for example, approximately 60 to 70 MHz. The CPU core, on the other hand, is powered by the 2.8 volt supply that runs at frequencies ranging from, for example, 130 MHz to 200 MHz. These exemplary numbers roughly translate to electrical current requirements of about 1 to 3 Amperes for the 3.3 volt supply, versus 5 to 7 Amperes for the 2.8 volt supply. This demands different performance characteristics for a voltage regulator.

There is a need for an efficient and cost effective solution to providing voltage regulators for systems running with multiple different power supply voltages.

SUMMARY OF THE INVENTION

The present invention provides dual adjustable voltage regulators on a single chip. The circuit of the present invention combines a switched-mode DC—DC converter with a linear regulator to meet different current requirements of different supply voltages. The invention also provides switching circuitry that can select between a fixed output voltage level and a user-adjustable output voltage. The circuit further provides means to automatically detect and generate power supply voltage levels as required by a system that may use for example various types of CPUs with different supply voltage requirements.

Accordingly, in one embodiment, the present invention provides a monolithic voltage regulator circuit that includes a switching regulator circuit, a linear regulator circuit and a reference signal generator whose output is shared by both the switching regulator circuit and the linear regulator circuit. The switching regulator circuit includes an oscillator having an input and an output, a control circuit comparing a signal at the output of the switching regulator circuit with the reference signal and generating a control signal coupled to the input of the oscillator, and an output buffer amplifier having an input coupled to the output of the oscillator and an output coupled to the output of the switching regulator.

The control circuit includes a first amplifier coupled to the output of the switching regulator circuit for sensing an output load current, an output of the first amplifier couples to the oscillator. The control circuit further includes a second amplifier that receives the reference signal and a first voltage signal internally generated in response to a voltage signal at the output of the switching regulator circuit and generates an output that couples to the oscillator. The control circuit also includes a third amplifier that receives the reference signal and a second voltage signal externally generated in response to the voltage signal at the output of the switching regulator circuit, and generates an output that couples to the oscillator.

One of either the second or the third amplifiers is digitally activated to select between a fixed regulated output voltage set by an internally supplied reference signal, and a variable regulated output voltage adjusted by an externally supplied reference signal. Thus, depending upon the demands of the system, the user can select between an output of a linear regulator or a switching regulator or both. Further, in one mode of operation, the user can adjust the output voltage level of the switching regulator.

A better understanding of the nature and advantages of the dual adjustable voltage regulator of the present invention may be had with reference to the detailed description and the drawings below.

DESCRIPTION OF THE PREFERRED EMBODIMENT

Figure 1:
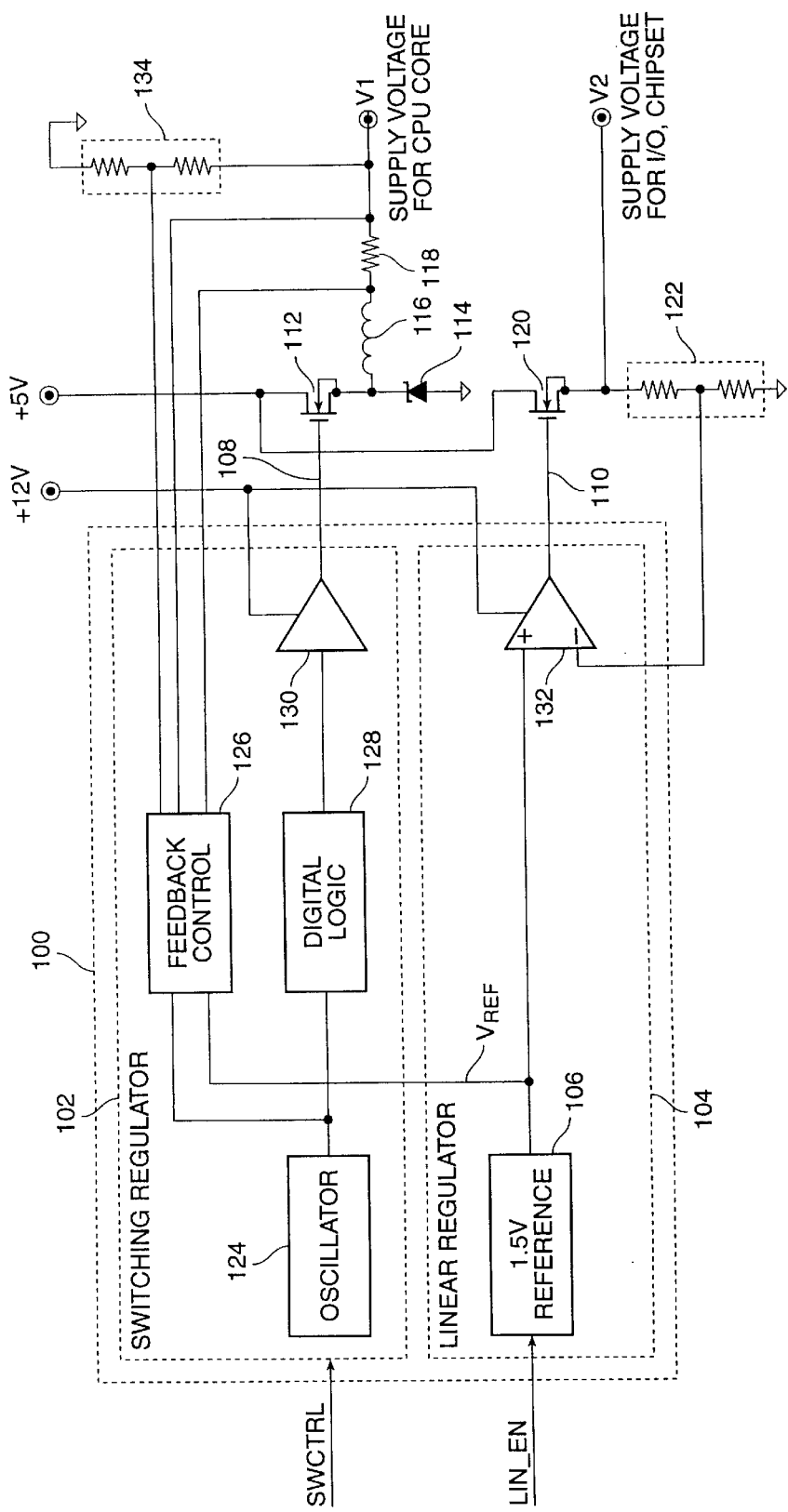
FIG. 1 is a simplified block diagram of the monolithic dual adjustable voltage regulators according to one embodiment of the present invention.

Referring to FIG. 1, there is shown a block diagram of the monolithic dual voltage regulator 100 according to one embodiment of the present invention. Dual regulator 100 includes a switching regulator circuit 102 and a linear regulator circuit 104. A reference voltage generator 106 is shown as part of linear regulator circuit 104, but its output is preferably shared by both regulator circuits. The output of switching regulator circuit 102 (node 108) couples to external circuitry including MOSFET 112, diode 114, inductor 116, and current-sensing resistor 118. A resistive voltage divider 134 feeds back a divided-down version of the voltage at V2 to switching regulator circuit 102. A first regulated output voltage V1 is provided at the output terminal of resistor 118. The output of linear regulator circuit 104 (node 110) couples to external circuitry including MOSFET 120 and resistive divider 122. A second regulated output voltage V2 is provided at the common node between MOSFET 120 and resistive divider 122.

Switching regulator circuit 102 performs a DC—DC conversion capable of delivering higher load currents of, for example, 10 Amperes. Linear regulator circuit 104 is designed to supply voltage to load circuitry with lower current requirements of, for example, 5 Amperes. Output voltage V1 is thus suitable for driving, for example, the core circuitry of the CPU that is more power hungry, while V2 can supply voltage to the I/O circuitry. The voltage levels at V1 and V2 can be set independently anywhere in the range of, for example, 1.5 to 3.6 volts, by adjusting the value of external resistive dividers 122 and 134.

Switching regulator circuit 102 includes an oscillator 124 that is controlled by a feedback control circuit 126. Output of oscillator 124 goes through digital logic 128 and is buffered by buffer circuit 130 before connecting to output node 108. Feedback control circuit 126 receives as inputs a signal representing the amount of output load current sensed by resistor 118, as well as the level of output voltage through resistive divider 134, and controls oscillator 124 accordingly. Feedback control circuit 126 also receives a reference voltage Vref at generated by reference voltage generator 106. Switching regulator circuit 102 also receives a switcher control SWCTRL input signal that selects between one of two different output voltages based on system demands.

Linear regulator circuit 104 includes a low-offset operational amplifier 132 as the controlling element. Operational amplifier 132 compares the divided-down output of linear regulator to the output of the precision reference voltage generator 106. An error signal at the output of operational amplifier 132 is then used to control external N-channel MOSFET 120. It is to be understood that a bipolar junction transistor such as a power NPN transistor can be used instead of N-channel MOSFET 120. Linear regulator 104 also receives an enable input LIN_EN that automatically enables or disables operational amplifier 132 in response to external control signal. Reference voltage generator 106 is preferably a precision band-gap type reference circuit. Its temperature coefficient is preferably trimmed to provide a near zero TC.

Figure 2:
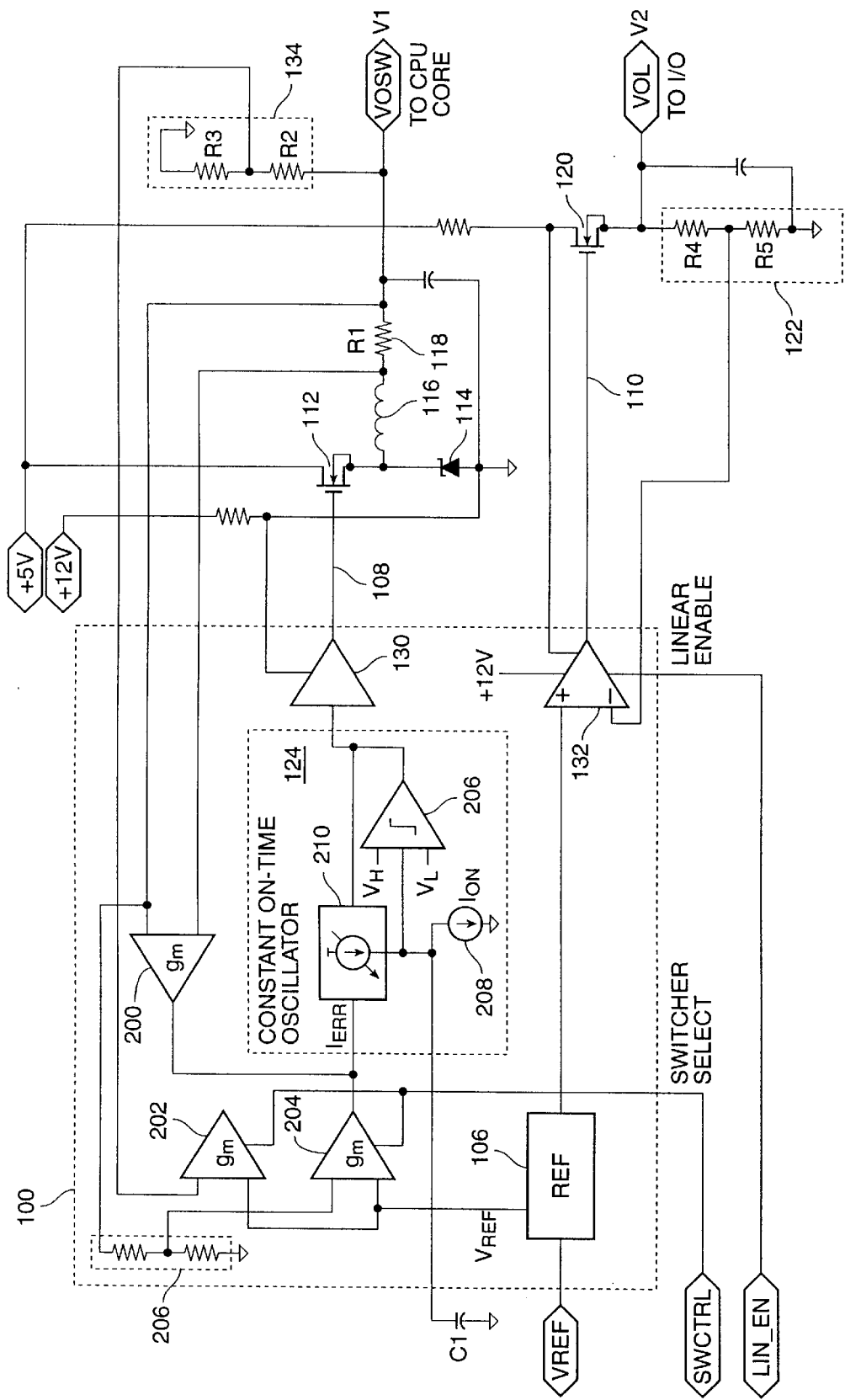
FIG. 2 shows an exemplary circuit implementation of the monolithic dual adjustable voltage regulators.

The operation of dual voltage regulator 100 will be described in more detail hereinafter in connection with FIG. 2 wherein the same reference numerals as in FIG. 1 are used to refer to same elements. As shown in FIG. 2, the main control loop for switching regulator circuitry includes a current conditioning amplifier 200 that receives at its inputs the output current signal from sense resistor 118, and a first voltage conditioning amplifier 202 that receives at a first input the externally divided-down output voltage signal fed back via resistive divider 134, and the precision reference voltage Vref at a second input. The control loop further includes a second voltage conditioning amplifier 204 that receives at a first input an internally divided-down output voltage signal fed back via an internal resistive divider 206, and Vref at a second input. The outputs of all three amplifiers 200, 204 and 206 couple to oscillator input 124. Thus, the raw voltage and current information from the switching regulator output are compared against the precision reference Vref to generate an error signal (Ierr). The error signal Ierr is then applied to the input of oscillator 124 and controls the on/off time of the oscillator output signal.

Amplifier 202 receives SWCTRL at an enable input while amplifier 204 receives the inverse of SWCTRL at its enable input. Similarly, operational amplifier 132 receives LIN_EN signal at its enable input. When SWCTRL signal is asserted (i.e., logic high), amplifier 204 is activated and amplifier 202 is disabled. This places the circuit in the fixed output voltage mode where V1 is set by precision internal resistors in resistive divider 206. When a logic low is applied to SWCTRL, V1 can be adjusted externally by external resistive divider 134. Thus, the two voltage conditioning amplifiers act as an analog switch to select between the internal resistor divider network (set for e.g., 3.5 V) or an external resistor divider network (adjustable for e.g., 1.5 V to 3.6 V). The LIN_EN input is used to enable or disable the linear regulator. When a logic high is applied to LIN_EN, the linear regulator will be disabled. If a logic low is applied to LIN_EN, the linear regulator output (V2) can be adjust (from e.g., 1.5 V to 3.5 V) using external precision resistors R4 and R5 in resistive divider 122. In some systems, the linear regulator output may be optionally left on to provide power to other 3.3 V components such as SRAM, DRAM and I/O chipset.

In a preferred embodiment of the present invention, oscillator 124 of switching regulator circuit 102 is designed as a fixed on-time, variable off-time oscillator. Constant-on-time oscillator 124 includes a comparator 206, an external capacitor C1, a fixed current source 208, a variable current source 210, and logic circuitry that selects between two threshold voltages for comparator 206. External timing capacitor C1 is alternately charged and discharged through the enabling and disabling of fixed current source 208. Variable current source 210 is controlled from by error signal Ierr. Oscillator off-time is controlled by the amount of current that is available from variable current source 210 to charge external capacitor C1 up to the high threshold level $V_H$ of comparator 206. The on-time is set be constant current source 208 that discharges external capacitor C1 down to the lower comparator threshold voltage $V_L$. By thus keeping the on-time of switch transistor 112 constant, the circuit of the present invention operates to reduce the switching frequency under lower load currents. This in turn reduces switching loss and improves the efficiency of the regulator at low currents. A specific embodiment for constant-on time oscillator 124 is described in detail in the above-referenced related U.S. patent application No. 08/622,098, entitled "Constant On-Time Architecture for Switching Regulators."

An example of an application for the dual adjustable voltage regulator of the present invention is in computer system motherboards that use Intel P54 and P55C Pentium® processors. Intel P54 processor requires a 3.5 V power supply voltage level while Intel P55C requires a 2.8 V power supply level for the CPU core while the I/O requires a 3.3 V power supply voltage level. Intel has specified a logic pin on both the P54 and P55C Pentium® processors in order to simplify the task of designing a "flexible motherboard" that can accept both varieties of CPU. This pin (VCC2DET) is internally bonded to ground on the P55C and left unconnected on the P54 and its equivalents. The two control inputs SWCTRL and LIN_EN of the dual adjustable voltage regulator of the present invention can read this CPU pin directly and automatically set each of its two outputs accordingly. When the SWCTRL is logic high, the switching regulator will set its output at 3.5 V using two internal precision resistors in resistive divider 206. When this input is logic low, V1 can be set to any voltage between 1.5 V and 3.6 V using external precision resistors R2 and R3. A logic low level is applied to LIN_EN to enable the linear regulator and supply the 3.3 V level to the I/O circuitry for the P55C, or other 3.3 V components.

Thus when using the monolithic dual adjustable voltage regulator of the present invention the designer has complete flexibility in choosing the output voltage for each regulator from 1.5 V to 3.6 V. This is done by appropriately selecting the feedback resistors R2, R3, R4 and R5. These resistors are preferably 0.1% resistors to realize optimum output accuracy. Given a precision internal reference voltage Vref that is trimmed to be 1.5 V nominally, the following equations determine the output voltages of the two regulators:

Switching Regulator:

Linear Regulator:

$$V_{OUT} = 1.5 \times \left( \frac{R4 + R5}{R5} \right)$$

where:
R2>1.5 kΩ and (R2+R3)≦25 kΩ
R4>1.5 kΩ and (R4+R5)≦25 kΩ
An example is provided below:
For 2.8 V, $$V_{OUT} = 1.5 \times \left( \frac{R2 + R3}{R3} \right) = 1.5 \times \left( \frac{1.74k + 2.0k}{2.0k} \right) = 2.81 \text{ V}$$

For 3.3 V, $$V_{OUT} = 1.5 \times \left( \frac{R4 + R5}{R5} \right) = 1.5 \times \left( \frac{12.1k + 10k}{10k} \right) = 3.32 \text{ V}$$

In conclusion, the present invention provides, on a single chip, a dual adjustable voltage regulator that combines a switched-mode DC—DC converter with a linear regulator to meet different current requirements of different supply voltages. The invention also provides switching circuitry that can select between a fixed output voltage level and a user-adjustable output voltage. The circuit further provides means to automatically detect and generate power supply voltage levels as required by the system. While the above is a complete description of the preferred embodiment of the present invention, it is possible to use various alternatives, modifications and equivalents. The scope of the present invention should therefore be determined not with reference to the above description but should, instead, be determined with reference to the appended claims, along with their full scope of equivalents.

What is claimed is:

1. A monolithic dual adjustable voltage regulator, comprising:
    a switching regulator circuit having an input and an output, said switching regulator circuit comprising:
        an oscillator having an input and an output;
        a control circuit comparing a signal at said output of said switching regulator circuit with a reference signal and generating a control signal coupled to said input of said oscillator; and
        an output buffer amplifier having an input coupled to said output of said oscillator and an output coupled to said output of said stitching regulator;
    a linear regulator circuit including an operational amplifier having an output, a first input receiving said reference signal, a second input receiving a feedback signal; and
    a reference signal generating circuit generating said reference signal.

2. The monolithic dual adjustable voltage regulator of claim 1 wherein said control circuit comprises:
    a first amplifier coupled to said output of said switching regulator circuit for sensing an output load current, said first amplifier having an output coupled to said oscillator;
    a second amplifier receiving said reference signal and a first voltage signal internally generated in response to a voltage signal at said output of said switching regulator circuit, said second amplifier having an output coupled to said oscillator; and
    a third amplifier receiving said reference signal and a second voltage signal externally generated in response to said voltage signal at said output of said switching regulator circuit, said third amplifier having an output coupled to said oscillator.

3. The monolithic dual adjustable voltage regulator of claim 2 wherein said control circuit further comprises a first resistive voltage divider coupled to said output of said switching regulator circuit, said resistive voltage divider generating said first voltage signal.

4. The monolithic dual adjustable voltage regulator of claim 3 further comprising a select circuit coupled to said second and third amplifiers for selecting to activate one of said second or third amplifiers in response to a select signal.

5. The monolithic dual adjustable voltage regulator of claim 4 wherein, when said second amplifier is activated said switching regulator circuit generates a fixed output voltage with a predefined level, and
    wherein, when said third amplifier is activated said switching regulator circuit generates an output voltage externally adjustable by said second voltage signal.

6. The monolithic dual adjustable voltage regulator of claim 4 where in said select circuit further couples to said linear regulator circuit and selectively activates said linear regulator circuit.

7. The monolithic dual adjustable voltage regulator of claim 3 wherein said reference voltage generating circuit is a precision band-gap type circuit.

8. The monolithic dual adjustable voltage regulator of claim 3 wherein said oscillator is a current-controlled oscillator having a constant-on-time architecture.

9. The monolithic dual adjustable voltage regulator of claim 8 wherein said current-controlled oscillator comprises:
    a comparator coupled to a threshold signal;
    an adjustable current source coupled to an input of said comparator;
    a fixed current source coupled to said input of said comparator, said input of said comparator being adapted to receive an external timing capacitor; and
    a control circuit coupled between said output terminal of said comparator and said fixed current source,
    wherein, said control circuit controls an on/off timing of said fixed and adjustable current sources, respectively and in a complementary fashion.

10. The monolithic dual adjustable voltage regulator of claim 1 wherein said switching voltage regulator further comprises a control input terminal, and said linear regulator circuit comprises an enable input terminal.

11. A computer system using the monolithic dual adjustable voltage regulator of claim 10, the computer system comprising:

a power supply box providing a source of 5 volt and 12 volt supply voltages;

a processor chip having a central processing unit (CPU) and input/output (I/O) circuitry; and the monolithic dual adjustable voltage regulator of claim 10 coupled to receive said 5 volt and 12 volt supply voltages, and generating output voltages in response to digital control signal supplied by said processor chip to said control input terminal and said enable input terminal.

* * * * *